United States Patent
Eguchi et al.

(10) Patent No.: US 10,965,381 B2
(45) Date of Patent: Mar. 30, 2021

(54) UNDERWATER COMMUNICATION DEVICE AND UNDERWATER COMMUNICATION SYSTEM

(71) Applicant: PANASONIC INTELLECTUAL PROPERTY MANAGEMENT CO., LTD., Osaka (JP)

(72) Inventors: Kazuhiro Eguchi, Fukuoka (JP); Souichi Kawata, Fukuoka (JP); Katsuya Okamoto, Fukuoka (JP); Yoshio Koyanagi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/754,654

(22) PCT Filed: Jan. 29, 2019

(86) PCT No.: PCT/JP2019/003035
§ 371 (c)(1),
(2) Date: Apr. 8, 2020

(87) PCT Pub. No.: WO2019/187607
PCT Pub. Date: Oct. 3, 2019

(65) Prior Publication Data
US 2021/0006339 A1 Jan. 7, 2021

(30) Foreign Application Priority Data
Mar. 28, 2018 (JP) .............................. JP2018-062441

(51) Int. Cl.
*H04B 5/02* (2006.01)
*H04B 13/02* (2006.01)
(Continued)

(52) U.S. Cl.
CPC .............. *H04B 13/02* (2013.01); *H02J 50/12* (2016.02); *H02J 50/40* (2016.02); *H04B 5/0012* (2013.01); *H04B 5/02* (2013.01)

(58) Field of Classification Search
CPC ......... H04B 5/0031; H04B 5/02; H04B 13/02
(Continued)

(56) References Cited

U.S. PATENT DOCUMENTS 10,288,711 B1 * 5/2019 Schillak ............. G01R 33/3621
2010/0309080 A1 * 12/2010 Minemura ........... H01Q 9/0407
343/788
(Continued)

FOREIGN PATENT DOCUMENTS

JP 47-016013 8/1972
JP 2004-048297 2/2004
(Continued)

OTHER PUBLICATIONS

Official Communication issued in International Patent Application No. PCT/JP2019/003035, dated Feb. 26, 2019, along with an English translation thereof.
(Continued)

*Primary Examiner* — Adi Amrany
(74) *Attorney, Agent, or Firm* — Greenblum & Bernstein, P.L.C.

(57) ABSTRACT

A underwater communication device communicates data with another underwater communication device having another first coil and another second coil in water. The underwater communication device includes a first coil configured to transmit the data to and from the other first coil via a magnetic field, a second coil configured to transmit the data to and from the other second coil via a magnetic field, a supply unit configured to supply the data to the first coil and the second coil, a first capacitor connected to the first
(Continued)

coil and forming a first resonance circuit that resonates with the first coil at a first resonance frequency, and a second capacitor connected to the second coil and forming a second resonance circuit that resonates with the second coil at a second resonance frequency that is different from the first resonance frequency.

6 Claims, 11 Drawing Sheets

(51) Int. Cl.
    *H02J 50/12*     (2016.01)
    *H04B 5/00*     (2006.01)
    *H02J 50/40*     (2016.01)
(58) Field of Classification Search
    USPC .......................................... 307/104; 375/218
    See application file for complete search history.

(56) References Cited

U.S. PATENT DOCUMENTS

| | | | |
|---|---|---|---|
| 2012/0139358 A1* | 6/2012 | Teggatz | H04B 5/0093 |
| | | | 307/104 |
| 2013/0072117 A1* | 3/2013 | Bourdage | H01Q 7/00 |
| | | | 455/41.1 |
| 2014/0145906 A1 | 5/2014 | Kato et al. | |
| 2017/0085130 A1* | 3/2017 | Von Novak, III | H02J 7/025 |
| 2018/0215277 A1 | 8/2018 | Deguchi et al. | |

FOREIGN PATENT DOCUMENTS

| | | |
|---|---|---|
| JP | 2004-096182 | 3/2004 |
| JP | 2005-328319 | 11/2005 |
| JP | 2010-021874 | 1/2010 |
| WO | 2011/145515 | 11/2011 |
| WO | 2013/125610 | 8/2013 |
| WO | 2017/013825 | 1/2017 |

OTHER PUBLICATIONS

Office Action in JP2018-062441 dated Jul. 31, 2019, along with English language translation.

Office Action in JP2019-158846 dated Oct. 1, 2019, along with English language translation.

* cited by examiner

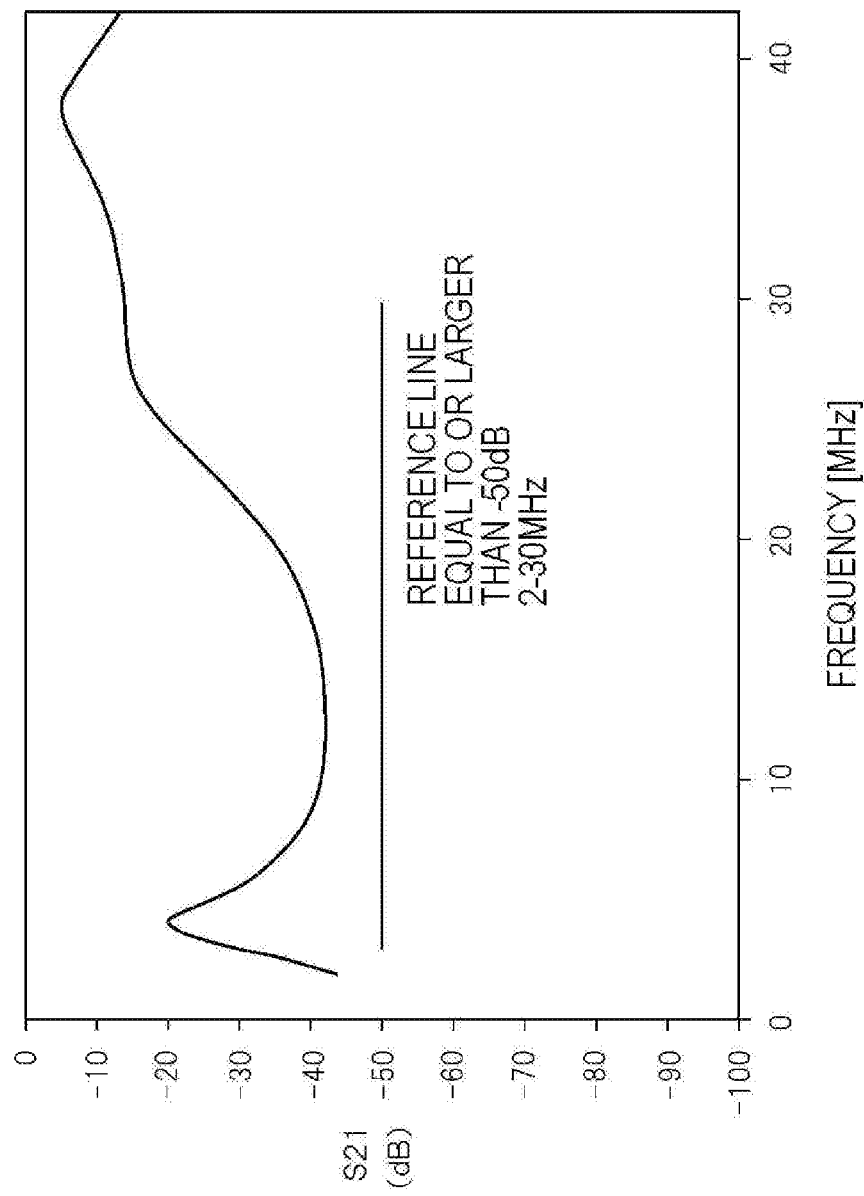

UNDERWATER COMMUNICATION DEVICE AND UNDERWATER COMMUNICATION SYSTEM

TECHNICAL FIELD

The present disclosure relates to an underwater communication device and an underwater communication system that communicate data in water.

BACKGROUND ART

Conventionally, ultrasonic communication (acoustic communication) is used for underwater communication (for example, in the sea). This is because a sound wave is effective in securing a transmission distance in water. For example, there has been known an underwater communication system in which the acoustic communication is performed between a water-surface station and an underwater station to reduce an influence of multiple reflections in water (see Patent Literature 1).

CITATION LIST

Patent Literature

Patent Literature 1: JP-A-2005-328319

SUMMARY OF INVENTION

Technical Problem

However, in a case where the acoustic communication is used in the sea, data transmission performance is low. Since a sound speed in the sea is about 1500 (m/s), a communication speed of the acoustic communication is about 1/200000 of a communication speed of a radio wave. In addition, a communication band is narrow, and a data transmission amount is as small as about 80 kbps. As described above, since the transmission performance is low in the acoustic communication, it is difficult to transmit data with a large amount of data such as still image or moving image. For example, even when trying to display an image acquired by a camera in the sea on a monitor on the ground, it is difficult to transmit video data in real time.

In a case where radio wave communication or current communication is used in the sea, electromagnetic waves are absorbed in seawater, and an attenuation amount thereof is large, so that propagation of the radio wave is difficult. For example, when a frequency used in undersea communication is about 1 kHz, the attenuation amount is 0.7 dB/m in fresh water, and 1.0 dB/m in seawater. On the other hand, when the frequency used in the undersea communication is about 100 MHz, the attenuation amount is 217.6 dB/m in fresh water and 324.3 dB/m in seawater. That is, when the frequency is increased in a case where a transmission speed is to be increased, transmission characteristics of the undersea communication deteriorate.

Although it is conceivable to extend a wired communication cable in water and perform wired communication, a communication range is limited to a range in which a communication cable can be extended. In addition, although it is also conceivable to perform communication using light in water, in a case where the light is used for a transmission medium, it is difficult to transmit data because transmission characteristics are greatly influenced by water turbidity and an obstacle. Further, light is strong in straightness, and light communication cannot be performed in a case where it is impossible to move straight.

The present disclosure has been made in view of the above circumstances, and provides an underwater communication device and an underwater communication system which can improve data transmission efficiency in water.

Solution to Problem

According to an aspect of the present disclosure, there is provided an underwater communication device that is adapted to communicate data with another underwater communication device including another first coil and another second coil in water, the device including: a first coil configured to transmit the data to and from the other first coil via a magnetic field; a second coil configured to transmit the data to and from the other second coil via a magnetic field; a supply unit configured to supply the data to the first coil and the second coil; a first capacitor connected to the first coil and forming a first resonance circuit that resonates with the first coil at a first resonance frequency; and a second capacitor connected to the second coil and forming a second resonance circuit that resonates with the second coil at a second resonance frequency that is different from the first resonance frequency.

According to an aspect of the present disclosure, there is provided an underwater communication system that is adapted to communicate data between a first underwater communication device and a second underwater communication device, wherein the first underwater communication device includes a first coil, a second coil, a supply unit configured to supply the data to the first coil and the second coil, a first capacitor connected to the first coil and forming a first resonance circuit with the first coil, and a second capacitor connected to the second coil and forming a second resonance circuit with the second coil, wherein the second underwater communication device includes a third coil configured to transmit the data to and from the second coil via a magnetic field, a fourth coil configured to transmit the data to and from the first coil via a magnetic field, a third capacitor connected to the third coil and forming a third resonance circuit with the third coil, and a fourth capacitor connected to the fourth coil and forming a fourth resonance circuit with the fourth coil, wherein the first coil, the second coil, the third coil, and the fourth coil are arranged in this order in water, wherein the first resonance circuit and the second resonance circuit have different resonance frequencies, wherein the third resonance circuit and the fourth resonance circuit have different resonance frequencies, wherein the first resonance circuit and the fourth resonance circuit have the same resonance frequency, and wherein the second resonance circuit and the third resonance circuit have the same resonance frequency.

Advantageous Effects of Invention

According to the present disclosure, the data transmission efficiency in water can be improved.

BRIEF DESCRIPTION OF DRAWINGS

FIG. 7 is a graph showing transmission characteristics of a first coil coupling body and a second coil coupling body.

DESCRIPTION OF EMBODIMENTS

Hereinafter, an embodiment will be described in detail with reference to the drawings. However, unnecessarily detailed descriptions may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following description are provided to enable those skilled in the art to fully understand the present disclosure, and are not intended to limit the claimed subject matter.

Figure 1:
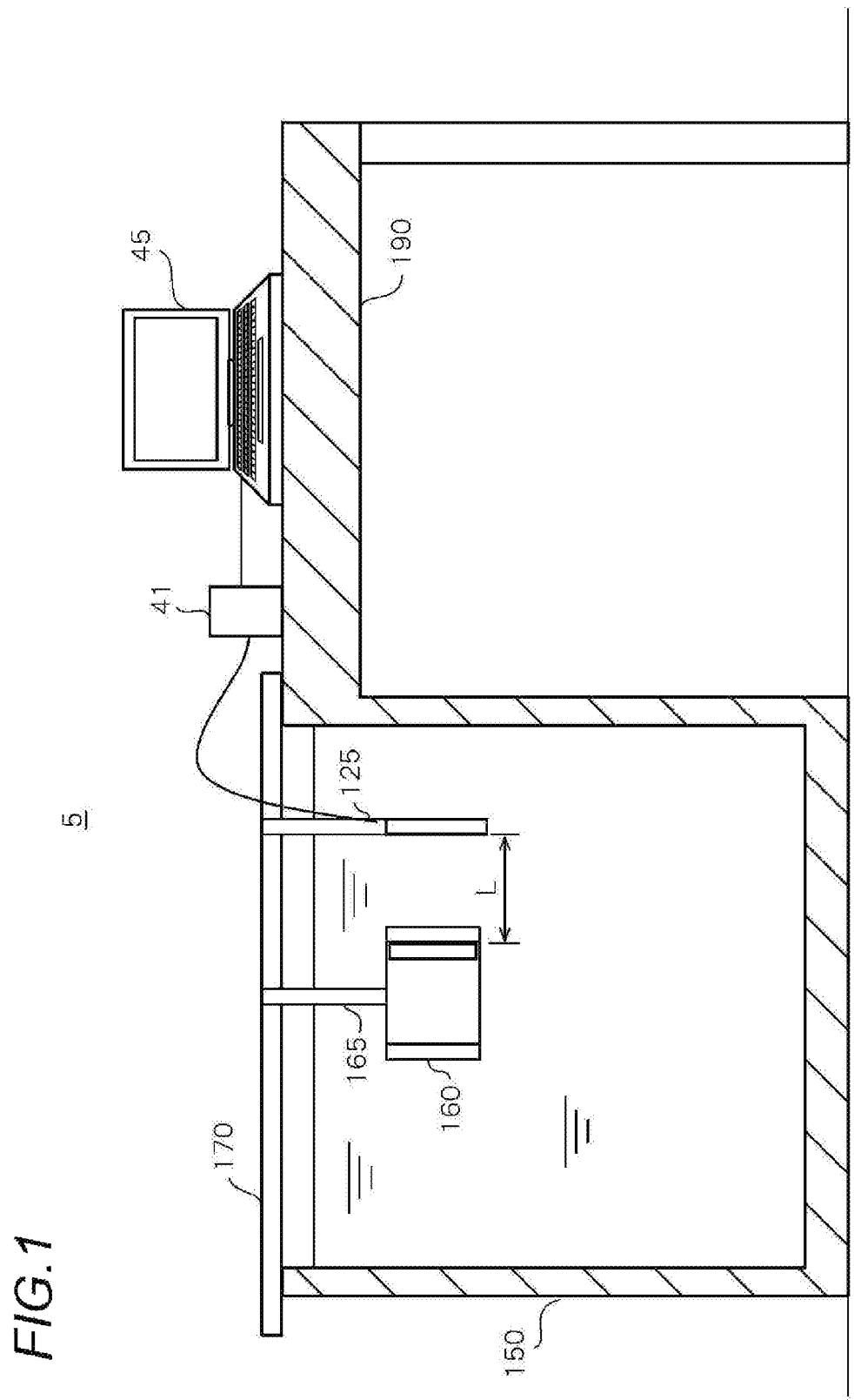
FIG. 1 shows a schematic configuration example of an underwater communication system according to an embodiment.
Figure 2:
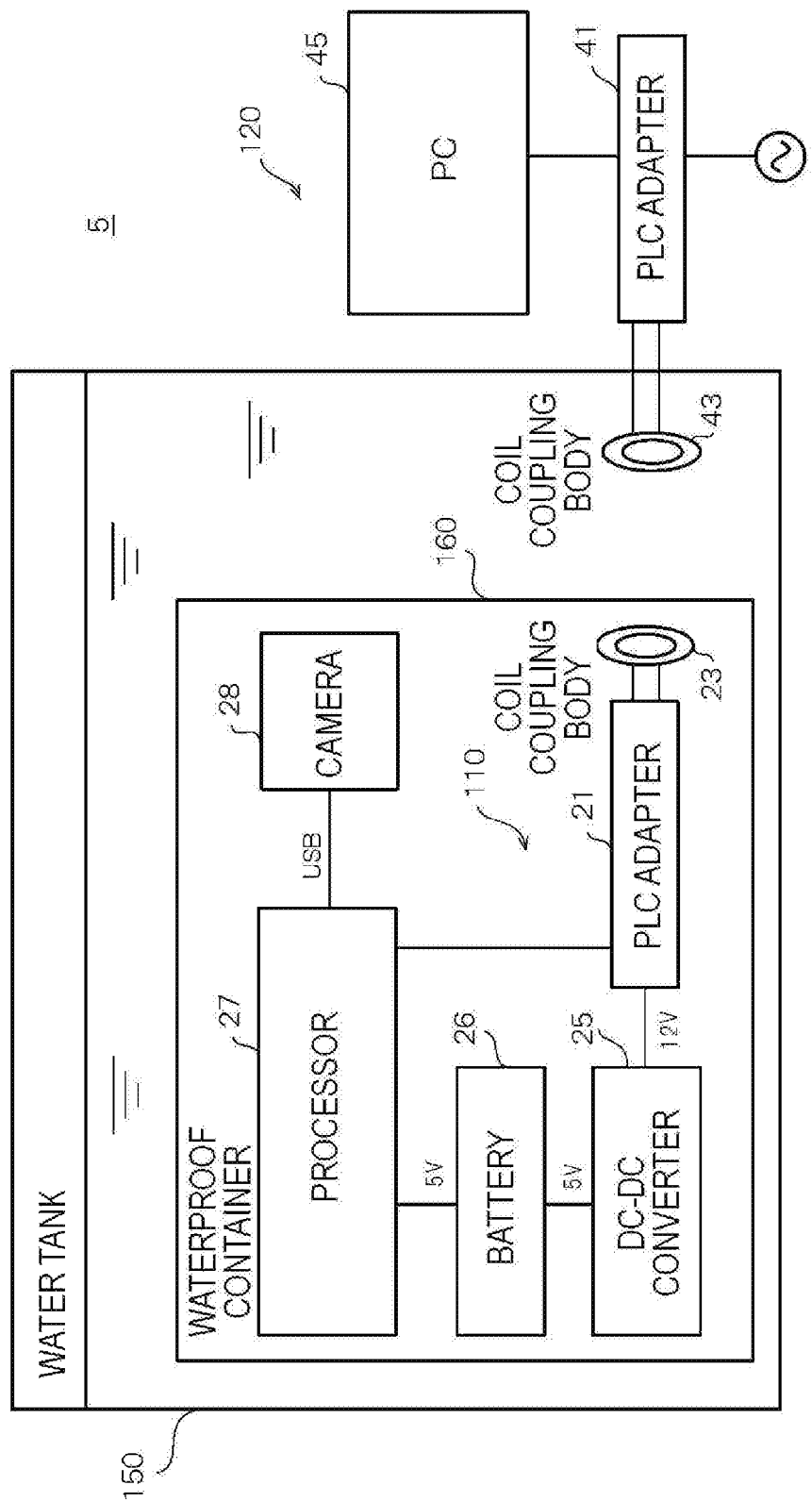
FIG. 2 is a block diagram showing a hardware configuration of the underwater communication system.

FIG. 1 shows a schematic configuration example of an underwater communication system 5 according to an embodiment. The underwater communication system 5 may be used as an experimental machine for testing a performance of underwater communication. FIG. 2 is a block diagram showing a hardware configuration of the underwater communication system 5.

The underwater communication system 5 includes a first communication device 110 and a second communication device 120 that can communicate bi-directionally. The first communication device 110 includes a first coil coupling body 23, capacitors Cr1, Cr2 (see FIG. 4), a power line communication (PLC) adapter 21, a DC-DC converter 25, a battery 26, a processor 27, and a camera 28. The second communication device 120 includes a second coil coupling body 43, capacitors Cr3, Cr4 (see FIG. 4), a PLC adapter 41, and a measurement personal computer (PC) 45. Each of the first coil coupling body 23 and the second coil coupling body 43 has a plurality of coils.

The first communication device 110 is accommodated in a waterproof container 160. The waterproof container 160 may be an openable/closable container that is sealed so that water does not enter inside. In addition, the waterproof container 160 is molded of a resin (for example, acrylic) that easily transmits a radio wave. The waterproof container 160 is disposed in water (for example, in the sea). In FIG. 1, the waterproof container 160 is disposed in a water tank 150. The waterproof container 160 is suspended from a pipe 170 fixed to a frame body of the water tank 150 via a support member 165. The support member 165 is movable in a longitudinal direction of the pipe 170. The waterproof container 160 may be disposed so as to be submerged in water stored in the water tank 150. The water tank 150 may store seawater or salt water instead of water. Incidentally, although not shown in FIGS. 1 and 2, the capacitors Cr1, Cr2 are disposed inside the waterproof container 160. The waterproof container 160 may have, for example, a pressure-resistant structure.

Alternatively, each coil of the first coil coupling body 23 may be disposed outside the waterproof container 160. In this case, each coil of the first coil coupling body 23 is coated since it is in contact the water in the water tank 150. In addition, the first coil coupling body 23 may be enclosed in a waterproof tube outside the waterproof container 160. The capacitors Cr1, Cr2 may be disposed in the water tank 150 with a waterproof countermeasure.

In the second communication device 120, the second coil coupling body 43 is suspended from the pipe 170 fixed to the frame body of the water tank 150 via a support member 125. The support member 125 is movable in the longitudinal direction of the pipe 170. The second coil coupling body 43 is disposed so as to be submerged in water stored in the water tank 150 and to face the first coil coupling body 23 of the first communication device 110. The disposing of the first coil coupling body 23 and the second coil coupling body 43 facing each other means that a surface (coil surface) defined by each coil included in the first coil coupling body 23 may be disposed so as to be parallel to a surface (coil surface) defined by each coil included in the second coil coupling body 43.

By moving the waterproof container 160 or the second coil coupling body 43 in the longitudinal direction of the pipe 170, an inter-coil distance L, which is a distance between the first coil coupling body 23 and the second coil coupling body 43, can be changed to any length. The movement of the waterproof container 160 or the second coil coupling body 43 in the longitudinal direction of the pipe 170 may be instructed by, for example, the processor 27 or the measurement PC 45, or may be instructed by another control device.

Each coil of the second coil coupling body 43 is coated in a case of being in contact with water in the water tank 150. In addition, the second coil coupling body 43 may be accommodated in a waterproof container or may be enclosed in a waterproof tube.

In FIGS. 1 and 2, the capacitors Cr3, Cr4 are not shown, but are disposed between the second coil coupling body 43 and the PLC adapter 41 outside the water tank 150. That is, by placing the capacitors Cr3, Cr4 in the air, an insulating property thereof can be easily secured. The capacitors Cr3, Cr4 may be disposed in the water tank 150 with a waterproof countermeasure.

In FIGS. 1 and 2, the first communication device 110 is accommodated in the waterproof container 160 and disposed to be submerged in water in the water tank 150, and the second communication device 120 is disposed outside the water tank 150 except for the second coil coupling body 43, but the disposing of the first communication device 110 and the second communication device 120 may be reversed. That is, the second communication device 120 is accommodated in the waterproof container 160 and disposed to be submerged in water in the water tank 150, and the first communication device 110 may be disposed outside the water tank 150 except for the first coil coupling body 23.

In the first communication device 110, the first coil coupling body 23 is formed such that coil surfaces of coils Lr1, Lr2 overlap each other (parallel to each other). The capacitor Cr1 may be connected in series with the coil Lr1, and forms a resonance circuit 111A (see FIG. 4) together with the coil Lr1. The capacitor Cr2 may be connected in series with the coil Lr2, and forms a resonance circuit 111B (see FIG. 4) together with the coil Lr2.

The DC-DC converter 25 receives a direct current voltage (for example, 5V) from the battery 26, converts a voltage value of the direct current voltage, and outputs the converted direct current voltage (for example, 12V) to the PLC adapter 21.

The processor 27 executes a program stored in a memory included in the first communication device 110 to realize various functions. The processor 27 controls each unit of the first communication device. The processor 27 controls the camera 28 connected by, for example, a universal serial bus (USB), and transmits image data acquired by the camera 28 to the PLC adapter 21.

The PLC adapter 21 supplies the direct current voltage 12V from the DC-DC converter 25 as a power source to the first coil coupling body 23. The PLC adapter 21 performs digital signal processing on data (for example, image data) input from the processor 27, and transmits the processed digital data to the second communication device 120 via the first coil coupling body 23 and the second coil coupling body 43. The PLC adapter 21 performs digital signal processing on the digital data received from the second communication device 120 via the second coil coupling body 43 and the first coil coupling body 23, and transmits the processed digital data to the processor 27. The PLC adapter 21 generates data according to a power line communication (PLC) method and supplies the generated data to the first coil coupling body 23.

In the second communication device 120, the second coil coupling body 43 is formed such that coil surfaces of coils Lr3, Lr4 overlap each other (parallel to each other). The capacitor Cr3 may be connected in series with the coil Lr3, and forms a resonance circuit 121A (see FIG. 4) together with the coil Lr3. The capacitor Cr4 may be connected in series with the coil Lr4, and forms a resonance circuit 121B (see FIG. 4) together with the coil Lr4.

The PLC adapter 41 performs digital signal processing on data (for example, control data) input from the measurement PC 45, and transmits the processed digital data to the first communication device 110 via the second coil coupling body 43 and the first coil coupling body 23. The PLC adapter 41 performs digital signal processing on the digital data received from the first communication device 110 via the first coil coupling body 23 and the second coil coupling body 43, and transmits the processed digital data to the measurement PC 45. The PLC adapter 41 generates data according to the power line communication (PLC) method and supplies the generated data to the second coil coupling body 43.

The measurement PC 45 may have a general PC hardware configuration, and may include a control unit, a communication unit, a storage unit, an operation unit, a display unit, and the like. The control unit of the measurement PC 45 performs various measurements for underwater communication using the first coil coupling body 23 and the second coil coupling body 43. In addition, the control unit of the measurement PC 45 receives data (for example, image data) from the first communication device 110 received via the first coil coupling body 23 and the second coil coupling body 43, and performs various processing based on the image data. The control unit realizes various functions by, for example, a processor executing a program.

Figure 3:
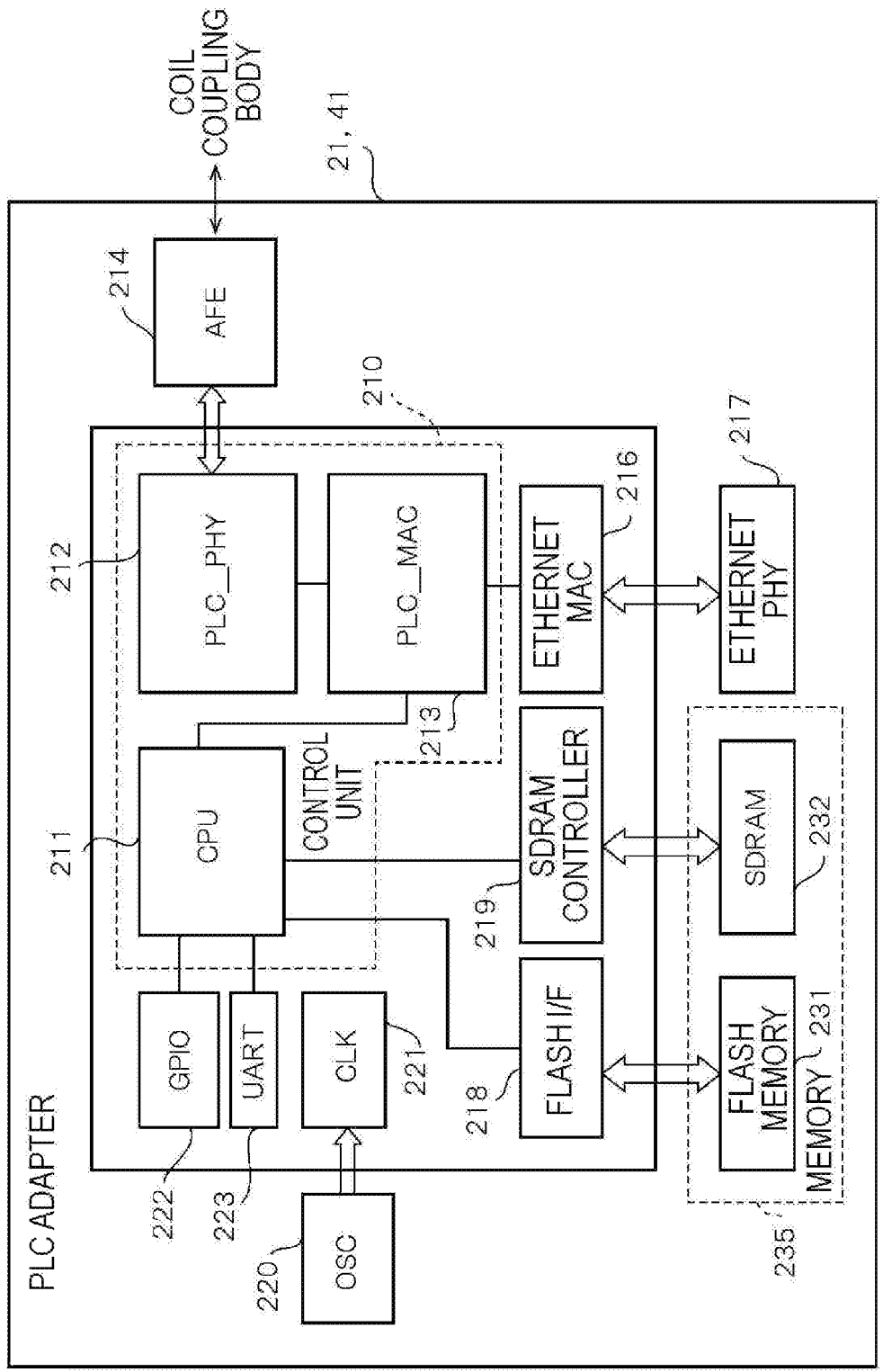
FIG. 3 shows a hardware configuration of a power line communication (PLC) adapter.

FIG. 3 shows a hardware configuration example of the PLC adapters 21, 41. Since the PLC adapters 21, 41 have the same hardware configuration, the PLC adapter 21 will be described here.

The PLC adapter 21 communicates by performing digital signal processing in orthogonal frequency-division multiplexing (OFDM). The PLC adapter 21 includes a control unit 210 and an AFE 214. The control unit 210 includes a CPU 211, a PLC_PHY block 212, and a PLC_MAC block 213.

The CPU 211 uses data stored in a memory 235 to control operations of the PLC_MAC block 213 and the PLC_PHY block 212, and controls each unit of the PLC adapter 21.

The PLC_PHY block 212 manages a physical (PHY) layer of a transmission signal and a reception signal. The PLC_MAC block 213 manages a media access control (MAC) layer of the transmission signal and the reception signal.

The AFE 214 may include a DA converter, an AD converter, and a variable amplifier (all not shown). The AFE 214 may convert a digital signal into an analog signal by the DA converter and transmit the analog signal. The AFE 214 may perform gain adjustment on the received analog signal by the variable amplifier, and may convert the analog signal into a digital signal by the AD converter.

The PLC adapter 21 further includes an Ethernet (registered trademark) MAC block 216, an SDRAM controller 219, a flash memory interface (I/F) 218, a general purpose input/output (GPIO) 222, a universal asynchronous receiver/transmitter (UART) 223, and a clock IC (CLK) 221.

An Ethernet (registered trademark) PHY block 217 is connected to the Ethernet (registered trademark) MAC block 216. The Ethernet (registered trademark) MAC block 216 manages the MAC layers of the transmission signal and the reception signal. The Ethernet (registered trademark) PHY block 217 manages the PHY layer of the transmission signal and the reception signal. For example, the processor 27 and the measurement PC 45 are connected to the Ethernet (registered trademark) PHY block 217.

The SDRAM controller 219 controls a read operation and a write operation with respect to an SDRAM 232. The flash memory interface 218 controls a read operation and a write operation with respect to a flash memory 231. The SDRAM 232 and the flash memory 231 may be part of the memory 235. In addition, the memory 235 may be another memory.

The GPIO 222 is a general purpose input/output interface. The UART 223 performs serial-to-parallel conversion or parallel-to-serial conversion on the input data and outputs the data. The clock IC 221 supplies a clock synchronized with a signal oscillated by an oscillator (OSC) 220 to each unit.

The control unit 210 performs signal processing including basic control or modulation/demodulation for data communication, for example. The control unit 210 modulates the data received from the processor 27 via the Ethernet (registered trademark) PHY block 217, and outputs the modulated data to the AFE 214 as transmission data. In addition, the control unit 210 demodulates the signal input from the first coil coupling body 23 via the AFE 214 as a reception signal, and outputs the signal to the processor 27 via the Ethernet (registered trademark) PHY block 217.

Communication by the PLC adapter 21 is performed in the following procedure. In the case of transmission, the data input from the processor 27 is transmitted to the control unit 210 via the Ethernet (registered trademark) PHY block 217. In the control unit 210, the digital signal processing is performed on the input data, and a digital signal is generated. The generated digital signal is converted into an analog signal by the AFE 214. The converted analog signal is output to the first coil coupling body 23. In the digital signal processing, modulation by OFDM is performed.

On the other hand, in the case of reception, the signal received from the first coil coupling body 23 is gain-adjusted by the AFE 214 and then converted into a digital signal. The converted digital signal is transmitted to the control unit 210. The control unit 210 performs the digital signal processing, and the digital signal is converted into digital data. The converted digital data is transmitted to the processor 27 via the Ethernet (registered trademark) PHY block 217.

Figure 4:
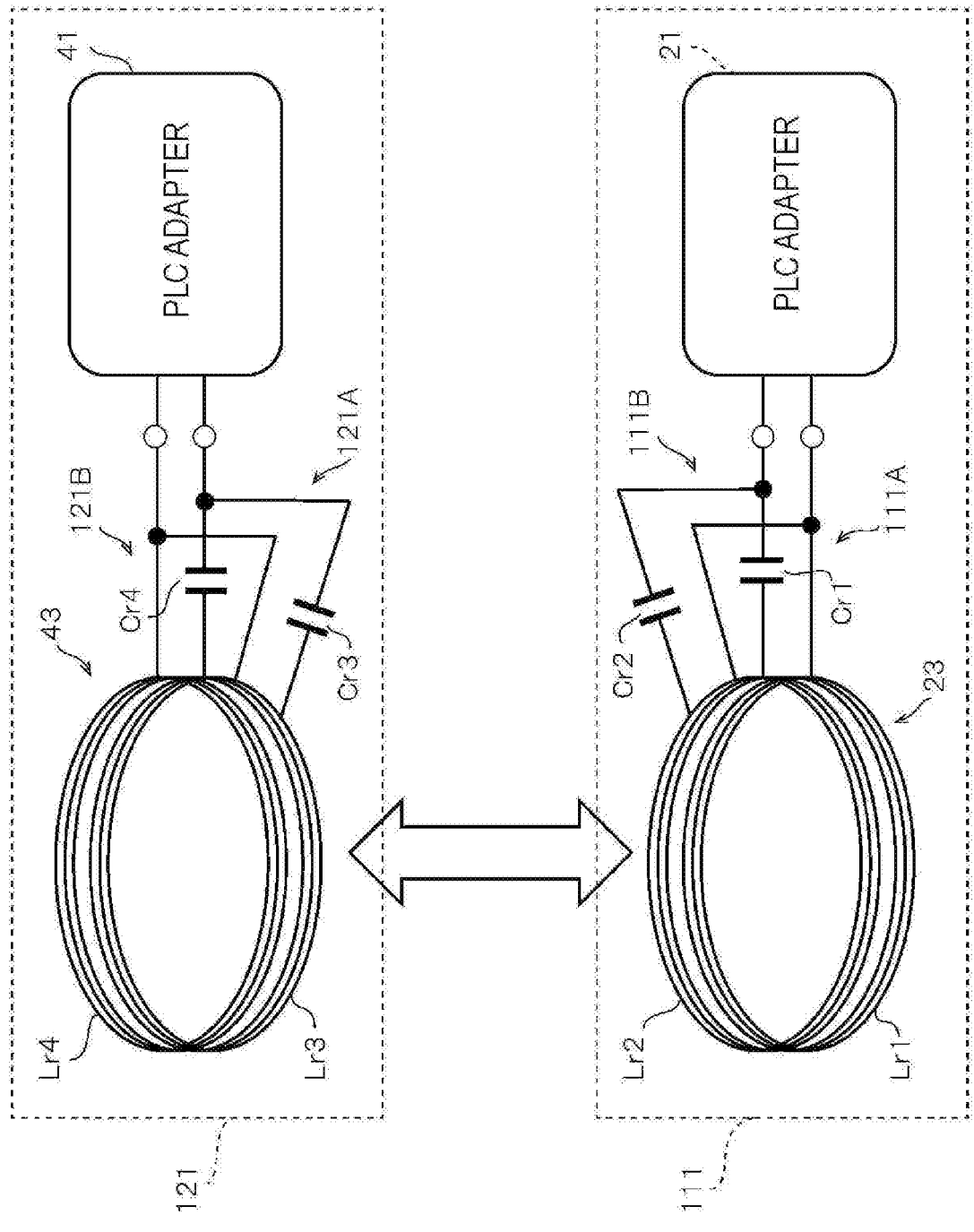
FIG. 4 shows a configuration example of a first communication unit and a configuration example of a second communication unit.

FIG. 4 shows a configuration example of a first communication unit 111 and a configuration example of a second communication unit 121. The first communication unit 111 includes the first coil coupling body 23, capacitors Cr1, Cr2, and the PLC adapter 21. The second communication unit 121 includes the second coil coupling body 43, capacitors Cr3, Cr4, and the PLC adapter 41.

In the first coil coupling body 23, the pair of coils Lr1, Lr2 are formed into a multi-stage in a data transmission direction and magnetically coupled to each other. The data transmission direction is a direction perpendicular to the coil surfaces of the coil Lr1 and the coil Lr2.

The capacitor Cr1 is connected in series with the coil Lr1. The coil Lr1 and the capacitor Cr1 form the resonance circuit 111A. A resonance frequency f1 of the resonance circuit 111A is represented by $1/2\pi(L1 \cdot C1)^{1/2}$ using an inductance L1 of the coil Lr1 and a capacitance C1 of the capacitor Cr1.

The capacitor Cr2 is connected in series with the coil Lr2. The coil Lr2 and the capacitor Cr2 form the resonance circuit 111B. A resonance frequency f2 of the resonance circuit 111B is represented by $1/2\pi(L2 \cdot C2)^{1/2}$ using an inductance L2 of the coil Lr2 and a capacitance C2 of the capacitor Cr2. By setting the resonance frequency f1 and the resonance frequency f2 to different values, a frequency band used for communication by the first coil coupling body 23 can be widened (see FIG. 7, and the like). That is, the first communication device 110 can realize a wide band antenna by the first coil coupling body 23.

Similarly, in the second coil coupling body 43, the pair of coils Lr3, Lr4 are formed in the multi-stage in the data transmission direction and magnetically coupled to each other. The data transmission direction is a direction perpendicular to the coil surfaces of the coil Lr3 and the coil Lr4.

The capacitor Cr3 is connected in series with the coil Lr3. The coil Lr3 and the capacitor Cr3 form the resonance circuit 121A. A resonance frequency f3 of the resonance circuit 121A is represented by $1/2\pi(L3 \cdot C3)^{1/2}$ using an inductance L3 of the coil Lr3 and a capacitance C3 of the capacitor Cr3.

The capacitor Cr4 is connected in series with the coil Lr4. The coil Lr4 and the capacitor Cr4 form the resonance circuit 121B. A resonance frequency f4 of the resonance circuit 121B is represented by $1/2\pi(L4 \cdot C4)^{1/2}$ using an inductance L4 of the coil Lr4 and a capacitance C4 of the capacitor Cr4. By setting the resonance frequency f3 and the resonance frequency f4 to different values, a frequency band used for communication by the second coil coupling body 43 can be widened (see FIG. 7). That is, the second communication device 120 can realize a wide band antenna by the second coil coupling body 43.

In FIG. 4, the coil Lr2 and the coil Lr3 face each other in the first coil coupling body 23 and the second coil coupling body 43. That is, the coils of the first coil coupling body 23 and the second coil coupling body 43 are arranged in an order of Lr1, Lr2, Lr3, and Lr4.

A winding direction of the coil Lr1 and a winding direction of the coil Lr2 may be the same or opposite. Similarly, a winding direction of the coil Lr3 and a winding direction of the coil Lr4 may be the same or opposite. In a case where the winding direction of the coil Lr1 and the winding direction of the coil Lr2 are opposite, the winding direction of the coil Lr1 and the winding direction of the coil Lr4 are the same, and the winding direction of the coil Lr2 and the winding direction of the coil Lr3 may be the same. That is, among the four coils, the two coils Lr2, Lr3 disposed inside and the two coils Lr1, Lr4 disposed outside may be wound in the same direction.

By setting the winding direction of the coil Lr1 and the winding direction of the coil Lr2 opposite to each other, in the underwater communication system 5, directions of currents flowing through the coil Lr1 and the coil Lr2 are opposite, and the transmission characteristics are changed. Therefore, for example, a value of S21 parameter representing the transmission characteristics described later becomes smooth in the band based on the two resonance frequencies. Therefore, a rapid change in characteristics in the frequency band is mitigated, and a communication technology requiring a wide band can be used.

Since the coil Lr2 of the first coil coupling body 23 and the coil Lr3 of the second coil coupling body 43 facing each other are wound in the same direction (the same winding direction), in the underwater communication system 5, polarities of the signals transmitted through a magnetic field due to the resonance can be made uniform, and the transmission characteristics can be improved.

The number of turns (for example, 5 turns) of the coils Lr1, Lr2, Lr3, and Lr4 may be the same or different. In addition, sizes of the coils Lr1, Lr2, Lr3, and Lr4 (for example, a diameter and a wire diameter of the coil) may be the same or different. Incidentally, as the number of turns of the coil increases, or as the diameter or wire diameter of the coil increases, energy generated by the magnetic field increases, and long distance transmission may be possible.

Figure 5:
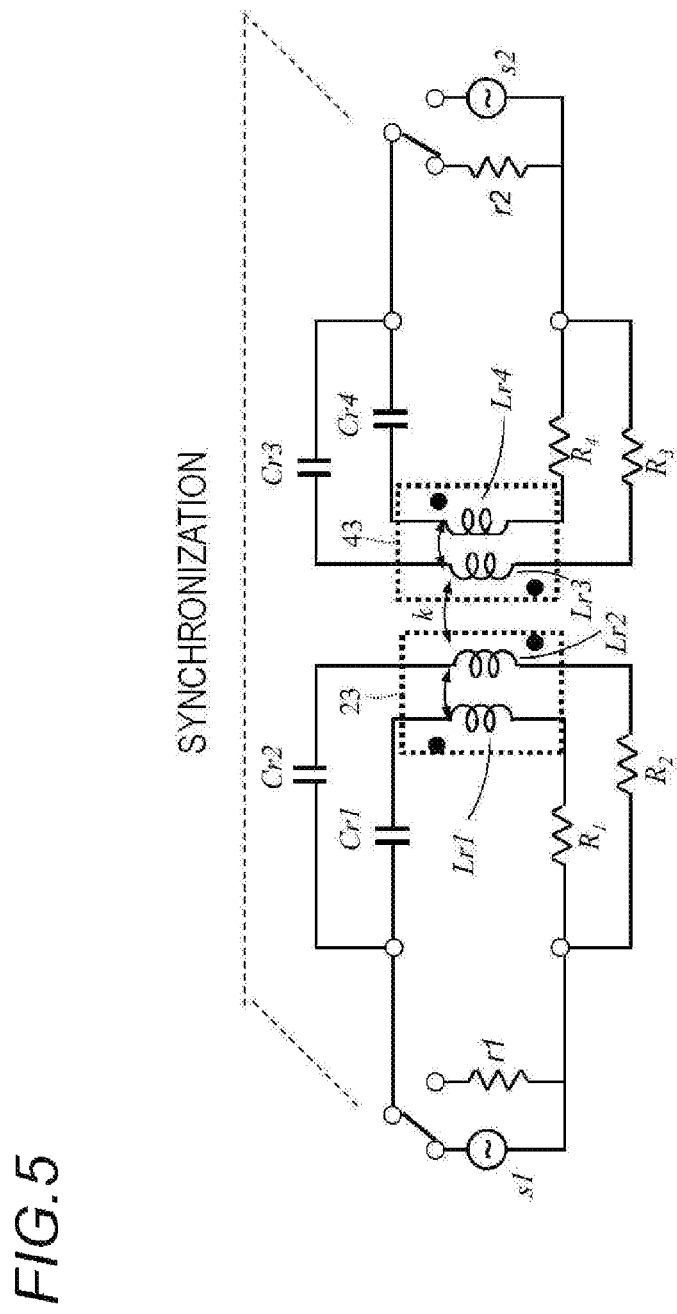
FIG. 5 shows an equivalent circuit of the first communication unit and an equivalent circuit of the second communication unit.

FIG. 5 shows an equivalent circuit of the first communication unit 111 and an equivalent circuit of the second communication unit 121. In FIG. 5, the first communication unit 111 and the second communication unit 121 may have the same characteristics (parameters), respectively.

As described above, the coil Lr1 and the capacitor Cr1 of the first coil coupling body 23 form the resonance circuit 111A. In addition, the coil Lr2 and the capacitor Cr2 of the first coil coupling body 23 form the resonance circuit 111B. The resonance frequencies f1, f2 of the resonance circuits 111A, 111B may be adjusted by varying capacitance values (capacitance) of the capacitors Cr1, Cr2, respectively. In this case, since it is not necessary to change the inductances of the coils Lr1, Lr2, the resonance frequencies f1, f2 can be adjusted without replacing the coils disposed in water. Incidentally, the resonance frequencies f1, f2 may be adjusted by varying the inductances of the coils Lr1, Lr2.

Similarly, the coil Lr3 and the capacitor Cr3 of the second coil coupling body 43 form the resonance circuit 121A. In addition, the coil Lr4 and the capacitor Cr4 of the second coil coupling body 43 form the resonance circuit 121B. The resonance frequencies f3, f4 of the resonance circuits 121A, 121B are adjusted by varying capacitance values (capacitances) of the capacitors Cr3, Cr4, respectively. Incidentally, the resonance frequencies f3, f4 may be adjusted by varying the inductances of the coil Lr3, Lr4.

The first coil coupling body 23 and the second coil coupling body 43 are magnetically coupled with a coupling coefficient k. In addition, the coil Lr1 and the coil Lr2 are wound in opposite directions as shown by black dots representing a positive polarity in FIG. 5. Similarly, the coil Lr3 and the coil Lr4 are wound in opposite directions. As described above, the coil Lr1 and the coil Lr4 are wound in the same direction, and the coil Lr2 and the coil Lr3 are wound in the same direction.

Here, although it is illustrated that each of the coil coupling bodies is a combination of two coils, each of the coil coupling bodies may be a combination of three or more coils. In addition, the number of coils forming the first coil coupling body 23 and the number of coils forming the second coil coupling body may be the same (for example, two) or different. Accordingly, the transmission characteristics of the first communication unit 111 and the second communication unit 121 may be adjusted in accordance with various applications.

Next, data transmission from the first communication device 110 to the second communication device 120 will be described.

In the resonance circuits 111A, 111B, when a current flows through the coils Lr1, Lr2 as a transmission coil of the first communication device 110, a magnetic field is generated around the coils Lr1, Lr2. A vibration of the generated magnetic field is transmitted to the resonance circuits 121A, 121B including the coils Lr3, Lr4 as a relay coil that resonates at the same frequency. The currents flowing through the coils Lr1, Lr2 includes a signal (also referred to as a PLC signal) according to the power line communication method.

In the resonance circuit 121A including the coils Lr3, Lr4, an alternating current is induced in the coils Lr3, Lr4 as a power reception coil by the vibration of the magnetic field of the coils Lr1, Lr2. The alternating current includes the PLC signal from the first communication device 110. In this way, for example, the PLC signal is transmitted from the first communication device 110 to the second communication device 120.

Figure 6:
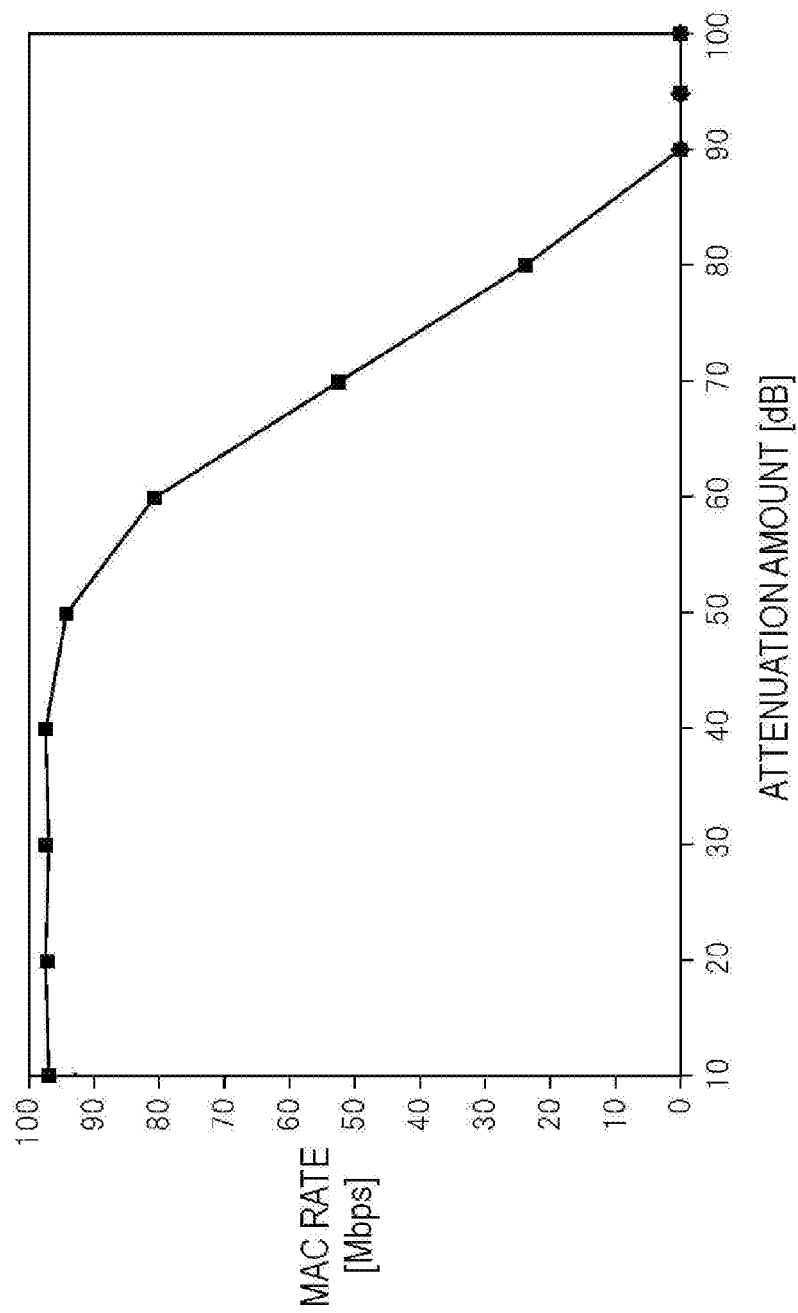
FIG. 6 is a graph showing a relationship between a transmission amount and an attenuation amount by the PLC adapter.

FIG. 6 is a graph showing an example of a relationship between a transmission amount and an attenuation amount by the PLC adapters 21, 41. FIG. 6 shows a result of the measured transmission characteristics in order to check communication performances of the first communication unit 111 including the PLC adapter 21 and the second communication unit 121 including the PLC adapter 41. Incidentally, the transmission characteristics of FIG. 6 are characteristics obtained in air, not in water.

The measurement of FIG. 6 shows the transmission characteristics in a case where the resonance circuits 111A, 111B, 121A and 121B are removed between the PLC adapters 21, 41, and an attenuator is inserted between the two PLC adapters 21, 41 to change the attenuation amount between the PLC adapters 21, 41. By the graph, if the attenuation amount between the resonance circuits 111B, 121B is known, a transmission speed between the PLC adapter 21, 41 can be known.

A vertical axis of the graph of FIG. 6 represents a transmission rate (MAC rate) [Mbps] of media access control (MAC). A horizontal axis of the graph represents the attenuation amount [dB]. In FIG. 6, the control unit of the measurement PC 45 measures the MAC rate while adjusting the attenuation amount in a transmission path (for example, air). That is, the measurement PC 45 may have a function as an attenuator.

In FIG. 6, the MAC rate is as high as about 100 Mbps up to a range of 40 dB or less, and then decreases with an increase of the attenuation amount. Even when the attenuation amount is 50 dB, the MAC rate is as high as about 95 Mbps. A communication environment in which various signals and noise are mixed in, for example, a power line or water may be considered as an environment in which the attenuation amount is large. Incidentally, a communication standard using the power line communication method is required to have the attenuation amount of 50 dB or less. In FIG. 6, when the attenuation amount is in the range of 50 dB or less, the MAC rate is about 95 Mbps or more, and a high MAC rate can be realized. That is, power line communication can be performed at a high MAC rate in the range where the attenuation amount is 50 dB or less.

FIG. 7 is a graph showing an example of the transmission characteristics of the first coil coupling body 23 and the second coil coupling body 43.

The first coil coupling body 23 and the second coil coupling body 43 used to measure the transmission characteristics of FIG. 7 are formed to have the same characteristics (parameters). The graph of FIG. 7 shows a measurement result measured using a configuration shown by the equivalent circuits shown in FIG. 5. In the measurement of FIG. 7, the transmission characteristics of the data transmission are measured by the measurement PC 45 using the second coil coupling body 43 connected to the measurement PC 45 via the PLC adapter 41.

Here, for example, the inductances of the coils Lr1 to Lr4 and the capacitances of the capacitors Cr1 to Cr4 are Lr1=Lr4=2 µH, Cr1=Cr4=126 pF, Lr2=Lr3=1 µH, and Cr2=Cr3=15.8 pF, respectively. The resonance frequencies f1, f2 at this time are 10 MHz and 40 MHz, respectively. In addition, for example, the inductances of the coils Lr1 to Lr4 and the capacitances of the capacitors Cr1 to Cr4 are Lr1=Lr4=1 µH, Cr1=Cr4=5.8 pF, Lr2=Lr3=2 µH, Cr2=Cr3=126 pF, respectively. The resonance frequencies f1, f2 at this time are 40 MHz and 10 MHz, respectively. For example, the diameter of each coil included in the coil coupling body is approximately 12 cm. For example, the inter-coil distance L is approximately 12 cm. At this time, a coupling coefficient k12 between the coil Lr1 and the coil Lr2 and a coupling coefficient k34 between the coil Lr3 and the coil Lr4 are k12=k34=0.7, a coupling coefficient k14 between the coil Lr1 and the coil Lr4 and a coupling coefficient k23 between the coil Lr2 and the coil Lr3 are k14=k23=0.05, and a coupling coefficient k13 between the coil Lr1 and the coil Lr3 and a coupling coefficient k24 between the coil Lr2 and the coil Lr4 are k13=k24=0.01. For example, the first coil coupling body 23 and the second coil coupling body 43 are disposed in the salt water and measured, and concentration of the salt water is 4%.

A vertical axis of the graph of FIG. 7 is the S21 parameter [dB] used for a transfer function. A horizontal axis is the frequency [MHz]. The S21 parameter represents the transmission characteristic (attenuation·phase characteristic), and the larger the value, the easier the radio wave passes. In FIG. 7, the control unit of the measurement PC 45 measures a value of the S21 parameter while changing the frequency associated with the data transmission. Incidentally, the S21 parameter in the vertical axis is different in sign from the attenuation amount shown in FIG. 6, but both have similar attenuation characteristics.

In the second communication unit 121, the resonance frequency f3 of the resonance circuit 121A is either 10 MHz or 40 MHz as described above, and the resonance frequency f4 of the resonance circuit 121B is the other one of 10 MHz and 40 MHz as described above. In FIG. 7, by magnetically coupling the respective resonance circuits (for example, resonance circuits 111A, 111B, 121A and 121B), peaks of the S21 parameter appear at two points in the vicinity of 3 MHz and in the vicinity of 28 MHz. Incidentally, the resonance circuits are magnetically coupled, the peak portions of the S21 parameter is suppressed from being steep, and a relatively smooth characteristic is obtained.

The value of the S21 parameter shown in FIG. 7 is −50 dB or more at any frequency in the frequency band of 2 MHz to 30 MHz. As described above, the range of the value of the S21 parameter of −50 dB or more corresponds to a range of the attenuation amount of 50 dB or less in FIG. 6, and is a value required in the power line communication standard. The frequency band of 2 MHz to 30 MHz is a band required to be secured for the power line communication. Therefore, in the underwater communication system 5, by using the first coil coupling body 23 and the second coil coupling body 43, a state in which the transmission characteristics are relatively high can be realized in a wide band of approximately 2 MHz to 30 MHz, and the transmission characteristics required for the power line communication can be satisfied.

In the case of the conventional acoustic communication, a usable frequency band is, for example, about 1 MHz. Therefore, according to the underwater communication system 5 of the present embodiment, it can be understood that the usable frequency band includes at least 2 MHz to 30 MHz, and the transmission characteristics are significantly improved.

Next, a carrier to interference and noise ratio (CINR) that is an index representing the transmission efficiency will be described. The larger a value of CINR, the higher the transmission efficiency.

Figure 8A:
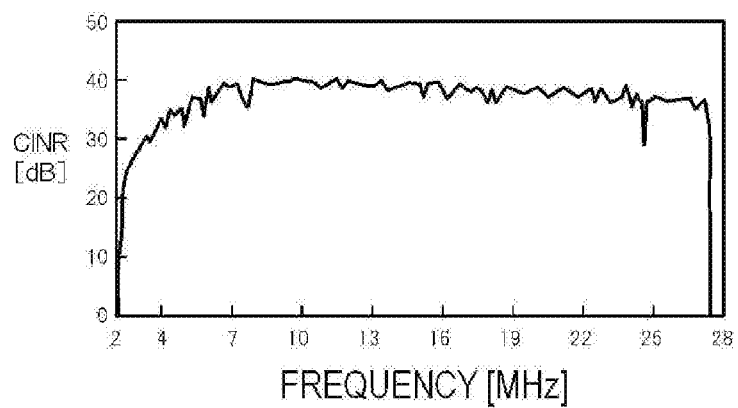
FIG. 8A is a graph showing a change in a frequency of CINR in a case where the PLC adapter is connected by a coaxial cable.

FIG. 8A is a graph showing an example of a change in a frequency of CINR in a case where the PLC adapters 21, 41 are connected by a coaxial cable. A vertical axis of the graph represents the value of CINR [dB]. A horizontal axis represents a frequency [MHz]. In this case, the first coil coupling body 23 and the second coil coupling body 43 are not interposed between the PLC adapter 21 and the PLC adapter 41. In a band of 3 MHz to 28 MHz included in the frequency band used by the PLC adapter, the value of CINR is uniformly large, and the transmission characteristics are uniform. That is, in FIG. 8A, there is almost no factor for signal attenuation between the PLC adapter 21 and the PLC adapter 41, and ideal transmission characteristics are obtained when transmitting the PLC signal.

Figure 8B:
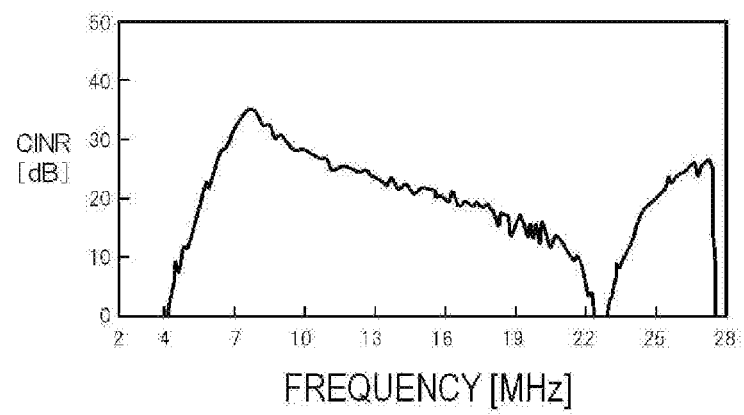
FIG. 8B is a graph showing a change in the frequency of CINR in a case where the first coil coupling body and the second coil coupling body are disposed with a distance of 1 cm away from salt water.

FIG. 8B is a graph showing an example of a change in the frequency of CINR in a case where the first coil coupling body 23 and the second coil coupling body 43 are disposed with a distance of 1 cm away from the salt water. In FIG. 8B, the value of CINR falls in the vicinity of 23 MHz, but in the band of 3 MHz to 28 MHz except for the vicinity of the frequency of 23 MHz, the value of CINR is relatively large, and generally good transmission characteristics are obtained.

Figure 8C:
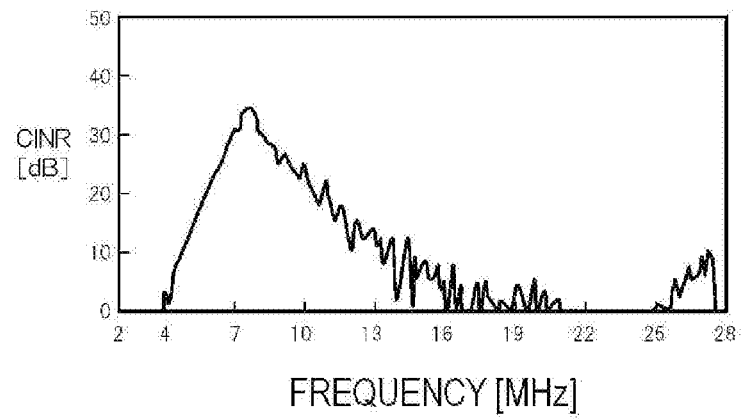
FIG. 8C is a graph showing a change in the frequency of CINR in a case where the first coil coupling body and the second coil coupling body are disposed with a distance of 20 cm away from the salt water.

FIG. 8C is a graph showing an example of a change in the frequency of CINR in a case where the first coil coupling body 23 and the second coil coupling body 43 are disposed with a distance of 20 cm away from the salt water. In FIG. 8C, the value of CINR is small in the band of 20 MHz to 25 MHz, but in the band of 3 MHz to 28 MHz except for the band of 20 MHz to 25 MHz (particularly, the band of 13 MHz or less), the value of CINR is relatively large, and generally good transmission characteristics are obtained. In an area of 13 MHz or more, there is a room for improvement in CINR characteristics.

Next, a relationship between a distance (inter-coil distance L) between the first coil coupling body 23 and the second coil coupling body 43 and the transmission rate (for example, MAC rate) will be described.

Figure 9:
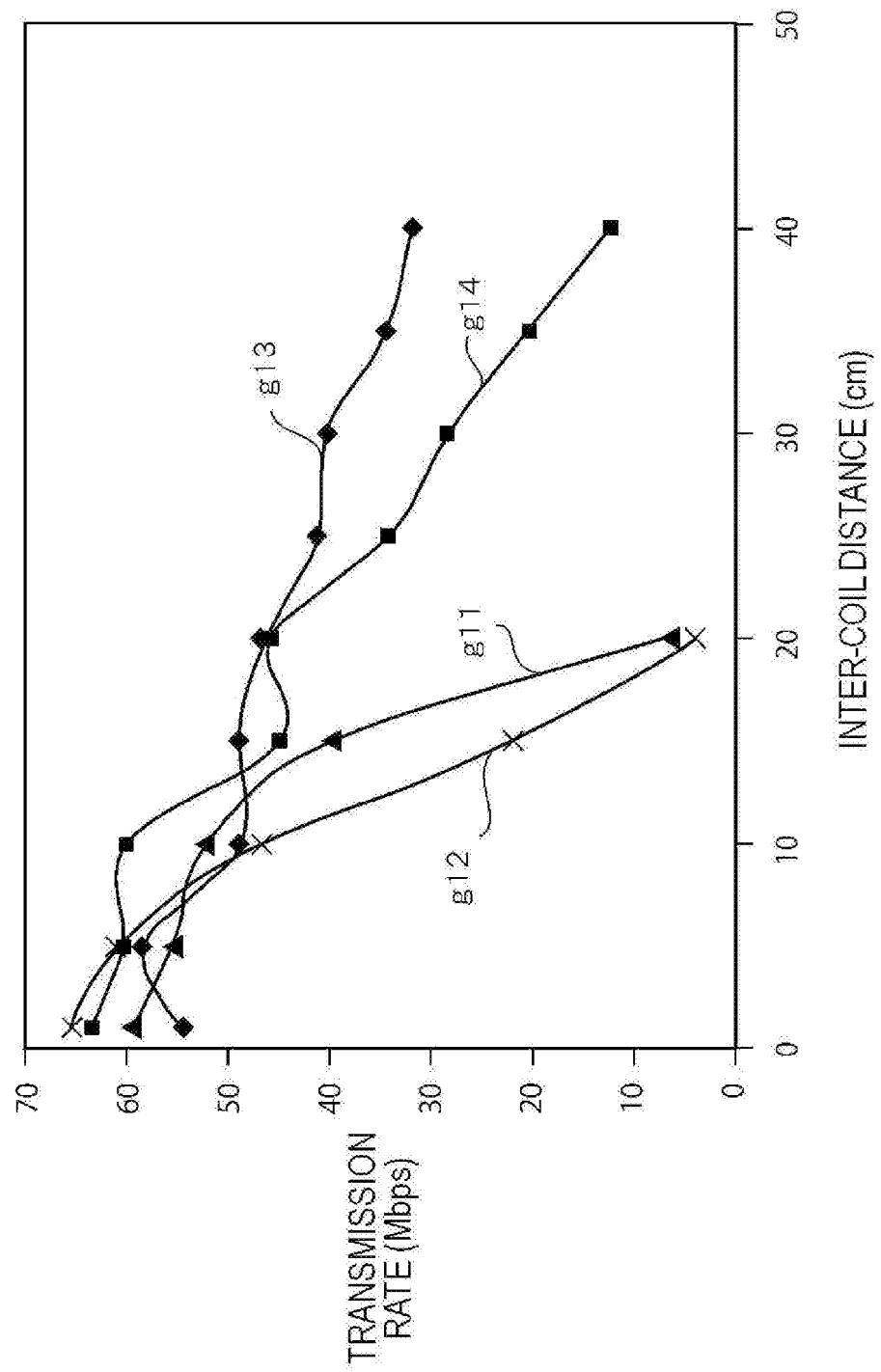
FIG. 9 is a graph showing a change in a transmission rate with respect to an inter-coil distance.

FIG. 9 is a graph showing an example of a change in the transmission rate with respect to the inter-coil distance L. A vertical axis of the graph represents the transmission rate [Mbps]. A horizontal axis represents the inter-coil distance [cm]. In FIG. 9, the control unit of the measurement PC 45 measures the transmission rate at the time of communication according to the transmission control protocol (TCP) protocol while changing the distance (that is, the inter-coil distance L) of the first coil coupling body 23 with respect to the second coil coupling body 43. In FIG. 9, the transmission rates at the time of communication (transmission and reception) between the first communication device 110 and the second communication device 120 in the air and the salt water were measured.

A graph g11 shows a case of transmitting data from the first communication device 110 to the second communication device 120 in the salt water. A graph g12 shows a case of transmitting data from the second communication device 120 to the first communication device 110 in the salt water.

As shown in the graphs g11, g12, in the salt water, the transmission rate rapidly decreases as the inter-coil distance L becomes longer. In FIG. 9, the transmission rate is secured at several Mbps or more even when the inter-coil distance L is separated to about 20 cm, but rapidly decreases when the inter-coil distance exceeds about 20 cm. Therefore, when the inter-coil distance L is in a range up to about 20 cm, the transmission rate is secured to be several Mbps, so that data (for example, still images or moving image data) with a relatively large amount of transmission, such as image data, can be communicated.

A graph g13 shows a case of transmitting data from the first communication device 110 to the second communication device 120 in the air. A graph g14 shows a case of transmitting data from the second communication device 120 to the first communication device 110 in the air. As shown in the graphs g13, g14, in the air, even when the inter-coil distance is around 40 cm, the transmission rate is secured at 10 Mbps or more.

Conventionally, the transmission distance in a case where data is transmitted in the sea using the PLC is about 10 mm. Compared with the transmission distance of 10 mm, in the underwater communication system 5, the transmission distance corresponding to the inter-coil distance L achieves about 20 cm, and it can be understood that the transmission distance remarkably extends as compared with the related art.

(Configuration Example Including Relay Coil) In the configuration examples shown in FIGS. 1 to 5, a case where the first coil coupling body 23 and the second coil coupling body 43 are directly coupled (in two stages) via the magnetic field is shown, but a third coil coupling body 63 may be provided as a relay coil between the first coil coupling body 23 and the second coil coupling body 43, and the coil coupling bodies may be coupled in three or more stages.

Figure 10:
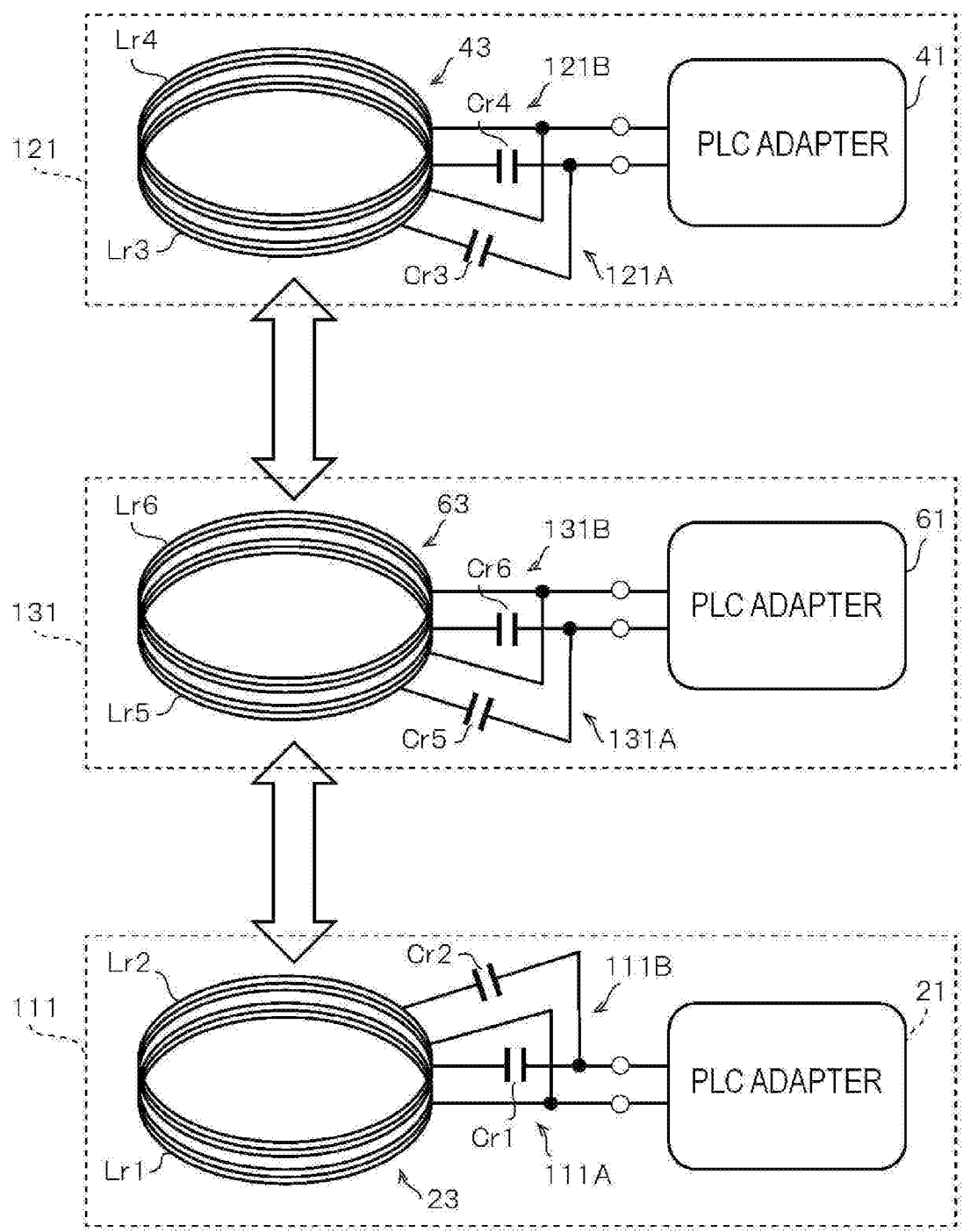
FIG. 10 shows a configuration example of the first communication unit, a configuration example of the second communication unit, and a configuration example of a third communication unit in a case where a third coil coupling body is interposed as a relay coil.

FIG. 10 shows a configuration example of the first communication unit 111, a configuration example of the second communication unit 121, and a configuration example of a third communication unit 131 in a case where the third coil coupling body 63 is interposed as a relay coil. The third communication unit 131 includes the third coil coupling body 63 and capacitors Cr5, Cr6. As shown in FIG. 10, the third communication unit 131 may include a PLC adapter 61 or may not include the PLC adapter 61.

Power may be supplied from a battery and the like to the third coil coupling body 63, or may not be supplied. That is, the third coil coupling body 63 may be, for example, a repeater (power supply coil) supplied with power by the PLC adapter 61, or may be a booster coil (parasitic coil) not supplied with power. That is, the repeater is active and the booster coil is passive.

The third coil coupling body 63 is formed such that coil surfaces of a coil Lr5 and a coil Lr6 overlap each other (parallel to each other). The capacitor Cr5 may be connected in series with the coil Lr5, and forms a resonance circuit 131A together with the coil Lr5. The capacitor Cr6 may be connected in series with the coil Lr6, and forms a resonance circuit 131B together with the coil Lr6. As shown in FIG. 10, the third coil coupling body 63 is interposed between the first coil coupling body 23 and the second coil coupling body 43.

In FIG. 10, the coil Lr2 and the coil Lr5 face each other in the first coil coupling body 23 and the third coil coupling body 63. The coil Lr3 and the coil Lr6 face each other in the second coil coupling body 43 and the third coil coupling body 63. That is, the coils of the first coil coupling body 23, the second coil coupling body 43, and the third coil coupling body 63 are arranged in an order of Lr1, Lr2, Lr5, Lr6, Lr3, and Lr4.

A winding direction of the coil Lr1 and a winding direction of the coil Lr2 may be the same or opposite. Similarly, a winding direction of the coil Lr3 and a winding direction of the coil Lr4 may be the same or opposite. Similarly, a winding direction of the coil Lr5 and a winding direction of the coil Lr6 may be the same or opposite.

In a case where the winding direction of the coil Lr1 and the winding direction of the coil Lr2 are opposite, the winding direction of the coil Lr1, the winding direction of the coil Lr6, and the winding direction of the coil Lr3 are the same, and the winding direction of the coil Lr2, the winding direction of the coil Lr5 and the winding direction of the coil Lr4 may be the same. That is, among the six coils, the inner coil and the outer coil of the adjacent coil coupling bodies may be wound in the same direction. In this case, the resonance frequencies f1, f6 and f3 of the resonance circuits 111A, 131B and 121A may be the same, and the resonance frequencies f2, f5 and f4 of the resonance circuits 111B, 131A and 121B may be the same.

The relay coil such as the coils Lr5, Lr6 may be disposed in multiple stages in the data transmission direction, and may be relayed in a plurality of stages. In addition, the relay coil such as the coils Lr5, Lr6 may be included in the first communication device 110, may be included in the second communication device 120, or may be provided independently of the first communication device 110 and the second communication device 120 in the underwater communication system 5.

Next, the data transmission from the first communication device 110 to the second communication device 120 via the relay coil will be described.

In the resonance circuits 111A, 111B, when the currents flow through the coils Lr1, Lr2 as the transmission coil of the first communication device 110, the magnetic field is generated around the coils Lr1, Lr2. The vibration of the generated magnetic field is transmitted to the resonance circuit 131A, 131B including the coils Lr5, Lr6 as the relay coil that resonates at the same frequency. The current flowing through the coils Lr1, Lr2 includes the PLC signal.

In the resonance circuits 131A, 131B including the coils Lr5, Lr6, currents in the coils Lr5, Lr6 are excited due to the vibration of the magnetic field, the currents flow, and a magnetic field is further generated around the coils Lr5, Lr6. The vibration of the generated magnetic field is transmitted to a resonance circuit including another relay coil that resonates at the same frequency, or the resonance circuits 121A, 121B including the coils Lr3, Lr4.

In the resonance circuit 121A, the alternating current is induced in the coils Lr3, Lr4 as the power receiving coil by the vibration of the magnetic field of the relay coil such as the coils Lr5, Lr6. The alternating current includes the PLC signal from the first communication device 110. In this way, for example, the PLC signal is transmitted from the first communication device 110 to the second communication device 120.

As described above, in the underwater communication system 5 according to the present embodiment, the first communication device 110 communicates data with the second communication device 120 (an example of another underwater communication device) having the second coil coupling body 43 in seawater (an example of water). The second coil coupling body 43 includes the coil Lr3 (an example of another first coil) and the coil Lr4 (an example of another second coil). The first communication device 110 includes the first coil coupling body 23 that transmits data to and from the second coil coupling body 43 via the magnetic field. The first coil coupling body 23 includes the coil Lr1 (an example of a first coil) and the coil Lr2 (an example of a second coil). The first communication device 110 includes the control unit 210 (an example of a supply unit) of the PLC adapter 21 that supplies data to the coil Lr1 and the coil Lr2. The first communication device 110 includes the capacitor Cr1 (an example of a first capacitor) connected to the coil Lr1 and forming the resonance circuit 111A (an example of a first resonance circuit) that resonates with the coil Lr1 at the resonance frequency f1 (an example of a first resonance frequency). The first communication device 110 includes the capacitor Cr2 (an example of a second capacitor) connected to the coil Lr2 and forming the resonance circuit 111B (an example of a second resonance circuit) that resonates with the coil Lr2 at the resonance frequency f2 (an example of a second resonance frequency).

Accordingly, in the first communication device 110, the characteristics of the resonance circuits 111A, 111B having different resonance frequencies f1, f2 can be combined to obtain the transmission characteristics having a plurality of peaks. In addition, the magnetic fields generated by the coil Lr1 and the coil Lr2 are coupled to each other, so that the peaks of the transmission characteristics are smoothed, and the transmission characteristics are smoothed between the two resonance frequencies. A rapid change in the characteristics in a wide frequency band is suppressed, and the transmission characteristics are leveled. Therefore, the first communication device 110 can widen the frequency band used for the data transmission. By widening the frequency band, the first communication device 110 can use a wide band communication (for example, the power line communication) to improve the transmission performance of data in water.

The winding direction of the coil Lr1 may be opposite to the winding direction of the coil Lr2.

The directions of the currents flowing through the coil Lr1 and the coil Lr2 are opposite, the transmission characteristics change, and the change in the transmission characteristics becomes smoother compared with the case where the winding direction of the coil Lr1 and the winding direction of the coil Lr2 are the same. Therefore, the first communication device 110 can further smooth the change in characteristics in the wide frequency band, and can stabilize the data communication using the wide band.

The first communication device 110 may include the third communication unit 131. The third communication unit 131 may include the third coil coupling body 63 interposed between the first coil coupling body 23 and the second coil coupling body 43. The third coil coupling body 63 may include the coil Lr5 (an example of a third coil) disposed between the coil Lr1 and the coil Lr3, and the coil Lr6 (an example of a fourth coil) disposed between the coil Lr2 and the coil Lr4. The third communication unit 131 includes the capacitor Cr5 (an example of a third capacitor) connected to the coil Lr5 and forming the resonance circuit 131A (an example of a third resonance circuit) that resonates with the coil Lr5, and the capacitor Cr6 (an example of a fourth capacitor) connected to the coil Lr6 and forming the resonance circuit 131B (an example of a fourth resonance circuit) that resonates with the coil Lr6. The resonance frequency f1 of the resonance circuit 111A and the resonance frequency f6 of the resonance circuit 131B may be the same. The resonance frequency f2 of the resonance circuit 111B and the resonance frequency f5 of the resonance circuit 131A may be the same.

Accordingly, the magnetic field generated by the first coil coupling body 23 and the magnetic field generated by the third coil coupling body 63 are coupled to each other, so that the first coil coupling body 23 can transmit the data to the third coil coupling body 63 by a magnetic resonance method. In addition, the third coil coupling body 63 can perform the data transmission to and from the second coil coupling body 43 including the coils Lr3, Lr4 as another relay coil or a reception coil by the magnetic resonance method. Therefore, the second coil coupling body 43 can relay the data transmission and extend a communication distance in the underwater communication.

The winding direction of the coil Lr1 and the winding direction of the coil Lr6 may be the same. The winding direction of the coil Lr2 and the winding direction of the coil Lr5 may be the same.

Accordingly, the directions of the currents flowing through the coil Lr1 and the coil Lr6 are the same, a magnetic field coupling force increases, and a signal level of the data transmission is increased as compared with a case where the winding direction of the coil Lr1 and the winding direction of the coil Lr6 are opposite to each other. Similarly, the directions of the currents flowing through the coil Lr2 and the coil Lr5 are the same, the magnetic field coupling force increases, and the signal level of the data transmission is increased as compared with a case where the winding direction of the coil Lr2 and the winding direction of the coil Lr5 are opposite to each other. Therefore, the first communication device 110 can reduce signal attenuation of data transmitted from the coils Lr1, Lr2 as the transmission coil to the coils Lr5, Lr6 as the relay coil, and can extend the communication distance of the underwater communication while suppressing a decrease in the signal level in water, for example.

The coil Lr5 and the coil Lr6 may be power supply coils to which power is supplied.

Accordingly, in the first communication device 110, the data received by the third coil coupling body 63 from the first coil coupling body 23 can be transferred to the second coil coupling body 43 of the second communication device 120 with a higher signal level. That is, even when a reception level by the third coil coupling body 63 is low, the first communication device 110 can transfer data by increasing a transmission level, and can suppress a decrease in communication accuracy in the underwater communication due to the signal level being attenuated each time data relay is performed.

The third coil coupling body 63 may be a parasitic coil to which power is not supplied.

Even when the coils Lr5, Lr6 included in the third coil coupling body 63 are not supplied with power, the first communication device 110 can transfer the received data based on the excitation of the currents by the magnetic field. Therefore, the first communication device 110 can realize relay of the data communication even in a place or a situation where it is difficult to secure the power supply for the coils Lr5, Lr6.

The data may include image data. The image data may include a still image or a moving image.

The first communication device 110 can transmit the image data in water by using a communication band secured in a wide band.

The data may also include data generated according to a communication method of the power line communication.

Since the first communication device 110 can widen the frequency band used for the data transmission, the transmission performance of data in water can be improved using the power line communication using the frequency band of 3 MHz to 28 MHz, for example. That is, the first communication device 110 can perform underwater communication by applying the existing power line communication technology.

The coil Lr1 and the coil Lr2 may transmit data in a direction substantially orthogonal to a water surface.

For example, the data communication can be performed between the first communication device 110 located on the water or near the water surface and the second communication device 120 located in the water or the water bottom.

The underwater communication system 5 of the present embodiment communicates data between the first communication device 110 (an example of a first underwater communication device) and the second communication device 120 (an example of a second underwater communication device). The first communication device 110 includes the coils Lr1, Lr2, the control unit 210 of the PLC adapter 21 that supplies data to the coils Lr1, Lr2, the capacitor Cr1 connected to the coil Lr1 and forming the resonance circuit 111A that resonates with the coil Lr1, and the capacitor Cr2 connected to the coil Lr2 and forming the resonance circuit 111B that resonates with the coil Lr2. The second communication device 120 includes the coil Lr3 (an example of the third coil) that transmits data to and from the coil Lr2 via the magnetic field, the coil Lr4 that transmits data to and from the coil Lr1 via the magnetic field, the capacitor Cr3 connected to the coil Lr3 and forming the resonance circuit 121A (an example of the third resonance circuit) that resonates with the coil Lr3, and the capacitor Cr4 connected to the coil Lr4 and forming the resonance circuit 121B (an example of the fourth resonance circuit) that resonates with the coil Lr4. In water, the coil Lr1, the coil Lr2, the coil Lr3, and the coil Lr4 are arranged in this order. The resonance circuit 111A and the resonance circuit 111B have different resonance frequencies. The resonance circuit 121A and the resonance circuit 121B have different resonance frequencies. The resonance circuit 111A and the resonance circuit 121B have the same resonance frequency. The resonance circuit 111B and the resonance circuit 121A have the same resonance frequency.

In the first communication device 110 of the underwater communication system 5, the characteristics of the resonance circuits 111A, 111B having different resonance frequencies f1, f2 can be combined to obtain the transmission characteristics having the plurality of peaks. In addition, the magnetic fields generated by the coil Lr1 and the coil Lr2 are coupled to each other, so that the peaks of the transmission characteristics are smoothed, and the transmission characteristics are smoothed between the two resonance frequencies. The rapid change in the characteristics in a wide frequency band is suppressed, and the transmission characteristics are leveled. Therefore, the first communication device 110 can widen the frequency band used for the data transmission. By widening the frequency band, the first communication device 110 can use the wide band communication (for example, the power line communication) to improve the transmission performance of data in water.

In the first communication device 110 and the second communication device 120, by resonating the inner coils Lr1, Lr4 and the outer coils Lr2, Lr3 among the four coils Lr1 to Lr4 at the same resonance frequency, a resonance force of the magnetic resonance between the resonance circuit 111A and the resonance circuit 121B is increased, a resonance force of the magnetic resonance between the resonance circuit 111B and the resonance circuit 121A is increased, and the attenuation of the signal in water is reduced. Therefore, the transmission distance in the underwater communication by the first communication device 110 and the second communication device 120 can be extended. For example, in an underwater communication system 5, the inter-coil distance L may be, for example, about 20 cm.

(Application Example of Undersea Communication System)

An undersea communication system 1010 will be described as an application example of the underwater communication system 5. In a case where a long transmission distance of the data communication using a coil coupling body CB (for example, the first coil coupling body 23, the second coil coupling body 43, and the third coil coupling body 63) can be secured, the following application examples can be realized.

Figure 11:
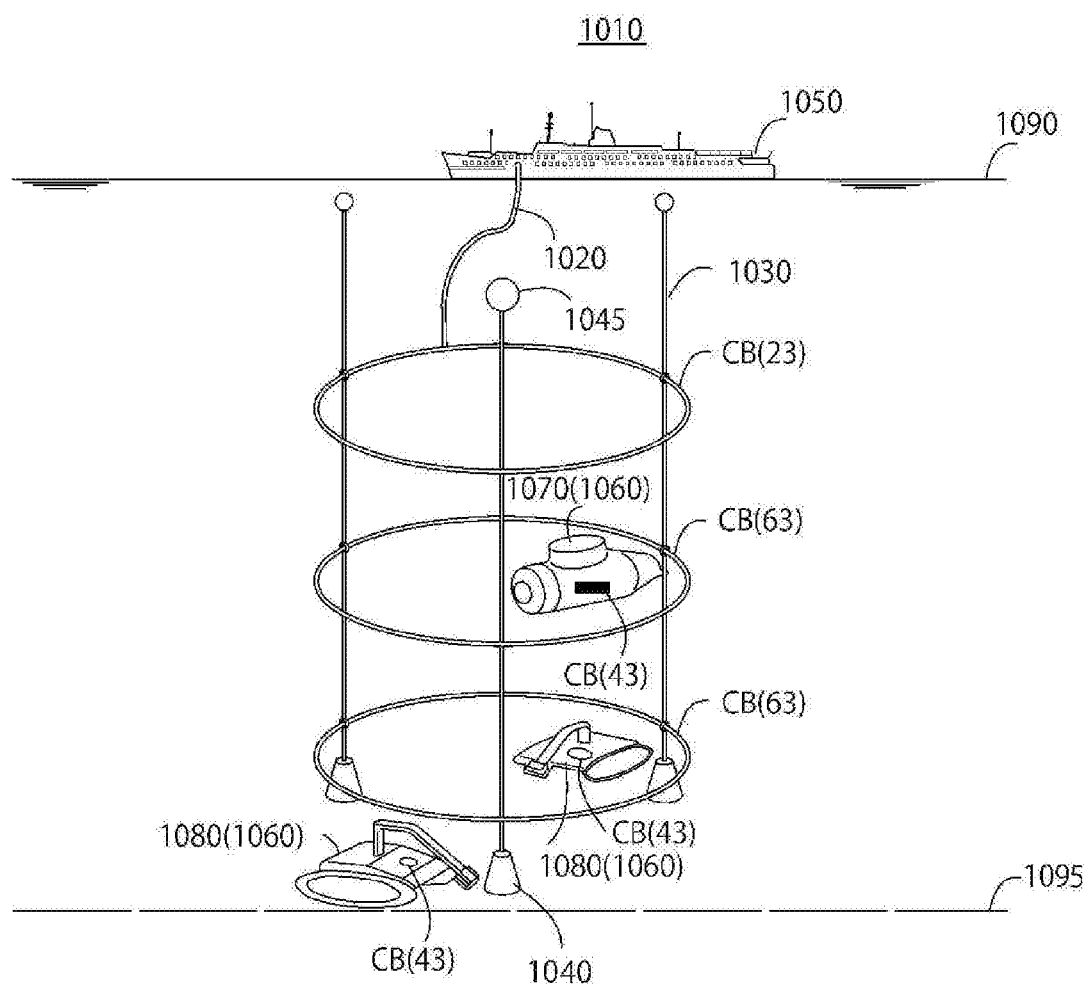
FIG. 11 is a schematic view showing an example of an environment in which a power transmission system is placed.

FIG. 11 is a schematic view showing an example of an environment in which the undersea communication system 1010 is placed. The undersea communication system 1010 includes the first communication device 110 and the second communication device 120. The undersea communication system 1010 includes a plurality of coil coupling bodies CB. The first communication device 110 wirelessly (without contact) transmits data to the second communication device 120 via the plurality of coil coupling bodies CB according to the magnetic resonance method. The number of coil coupling bodies CB to be disposed is n and is arbitrary.

Each coil of the coil coupling bodies CB is, for example, formed in an annular shape, covered with a cover made of resin, and insulated. Each coil of the coil coupling bodies CB is, for example, a helical coil or a spiral coil. In addition, each coil of the coil coupling bodies CB is formed of, for example, a cabtyre cable. Each coil of the coil coupling bodies CB operates as a primary coil in a case of transmitting data, operates as a secondary coil in a case of receiving data, and operates as a repeater or a booster coil in a case of relaying data. The coil coupling bodies CB may be disposed substantially parallel to each other, and may be disposed such that half or more of opening surfaces of the coils overlap each other, for example.

Components of the first communication device 110 other than the coil coupling bodies CB may be installed on a marine vessel 1050. Components of the second communication device 120 other than the coil coupling bodies CB may be installed in a movable underwater vehicle 1060 (for example, a submarine 1070 or a water bottom excavator 1080) or a second communication device (for example, a seismograph, a monitoring camera, a geothermal power generator) that is fixedly installed. Each coil coupling body CB is disposed in water (for example, in the sea).

The submarine 1070 may include, for example, a remotely operated vehicle (ROV), an unmanned underwater vehicle (UUV), or an autonomous underwater vehicle (AUV).

A portion of the marine vessel 1050 is above or in a water surface 1090 (for example, a sea surface), and other portions of the marine vessel 1050 is below or in the water surface 1090. The marine vessel 1050 is movable on the water and is freely movable on the water at a data acquisition location, for example. Components of the first communication device 110 other than the first coil coupling body 23 installed in the marine vessel 1050 and the first coil coupling body 23 may be connected by an electric wire 1020. The electric wire 1020 may be connected to, for example, the PLC adapter 21 in the first communication device 110 via a connector on water (not shown).

The underwater vehicle 1060 is in the water or in a water bottom 1095 (for example, sea floor) and travels in the water or in the water bottom 1095. The underwater vehicle 1060 is be freely movable to a data acquisition point, for example, according to an instruction from the marine vessel 1050 on water. The instruction from the marine vessel 1050 may be transmitted by communication via the coil coupling bodies CB, for example.

The coil coupling bodies CB are connected to connecting bodies 1030, and are disposed at equal intervals, for example. Incidentally, as a transmission frequency used for data transmission is lower, the power transmission distance becomes longer, and the inter-coil distance L can be made longer. The transmission frequency is determined based on coil characteristics such as an inductance of each coil of the coil coupling bodies CB, a diameter of each coil of the coil coupling bodies CB, the number of turns of each coil of the coil coupling bodies CB. In addition, the larger the thickness of each coil of the coil coupling bodies CB, that is, the larger a wire diameter of each coil of the coil coupling bodies CB, the smaller an electric resistance in each coil of the coil coupling bodies CB, and the smaller power loss.

Although the number of the connecting bodies 1030 is three in FIG. 11, the number of the connecting bodies 1030 is not limited thereto. A weight 1040 is connected to an end portion on a water bottom side of each of the connecting bodies 1030. A buoy (Buoy) 1045 is connected to an end portion on a water surface side of each of the connecting bodies 1030.

The weights 1040 can restrict a movement of the coupling bodies 1030, and can restrict a movement of each of the coil coupling bodies CB fixed to the connecting bodies 1030. Therefore, since the movement of each of the coil coupling bodies CB is restricted by the weights 1040 even if a water flow occurs in water, the undersea communication system 1010 can suppress reduction in data transmission efficiency using each of the coil coupling bodies CB.

In each of the connecting bodies 1030, the weight 1040 is connected to the end portion on the water bottom side, and the buoy 1045 is connected to end portion on the water surface side, so that the weight 1040 becomes the water bottom side, the buoy 1045 becomes the water surface side, and a posture in which the connecting body 1030 is substantially perpendicular to the water surface 1090 can be maintained. Therefore, a surface defined by each coil of the coil coupling bodies CB is substantially parallel to the water surface 1090, and the power can be transmitted in a water depth direction (direction substantially orthogonal to the water surface) by the magnetic field resonance method.

Incidentally, the weight 1040 may be removed from the connecting body 1030 when the connecting body 30 is transported, and may be attached to the connecting body 1030 when the transportation of the connecting body 1030 is completed and the connecting body 1030 is installed at a predetermined position. This facilitates the conveyance of the connecting body 1030.

In the undersea communication system 1010, a battery for operating each coil may be provided, or the battery for operating each coil may not be provided. In a case where the battery for operating each coil is not provided, for example, power is supplied to one coil coupling body CB (for example, the first coil coupling body 23), among the plurality of coil coupling bodies CB disposed in water, and the power may be transmitted according to the magnetic field resonance method.

In other words, the undersea communication system 1010 and a undersea power supply system can be realized by a single system. Accordingly, the undersea communication system 1010 can share a part of components between the underwater communication and the underwater power supply, so that the number of components can be reduced. In addition, the underwater vehicle 1060 in the sea or on the sea floor can use power received by a coil such as the second coil coupling body 43 of the second communication device 120 without using a battery. The coil for the data transmission and the coil for the power transmission may be the same coil or different.

Although various embodiments have been described above with reference to the drawings, it is needless to say that the present disclosure is not limited to such examples. It will be apparent to those skilled in the art that various changes and modifications can be conceived within the scope of the claims, and it is understood that such changes and modifications belong to the technical scope of the present disclosure.

In the above embodiments, seawater is mainly illustrated as water, but water (for example, fresh water) other than seawater may be used. Therefore, the first communication device 110 and the second communication device 120 may communicate in water other than seawater (for example, water in a river, a lake, and a dam).

In the embodiments described above, the power line communication has been illustrated as communication requiring a wide band, but the above embodiment can be applied to any communication method as long as it uses a wide band (for example, several MHz to 40 MHz) and a bang having a relatively low frequency.

In the embodiments described above, the processor (for example, CPU) may be physically configured in any way. In addition, by using a programmable processor, since the processing content can be changed by changing the program, a degree of freedom in design of the processor can be increased. The processor may be configured by one semiconductor chip, or may be configured by a plurality of semiconductor chips physically. In a case of being configured by the plurality of semiconductor chips, the controls of the above-described embodiments may be realized by different semiconductor chips. In this case, it can be considered that one processor is configured by the plurality of semiconductor chips. In addition, the processor may be configured by a member (such as a capacitor) having a function different from that of the semiconductor chip. One semiconductor chip may be configured so as to realize the functions of the processor and the other functions. Further, the plurality of processors may be configured by a single processor.

The above-described embodiments may be combined.

The present disclosure is based on a Japanese patent application No. 2018-062441 filed on Mar. 28, 2018, the contents of which are incorporated herein by reference.

INDUSTRIAL APPLICABILITY

The present disclosure is useful in an underwater communication device and the like that can improve data transmission efficiency in water.

REFERENCE SIGNS LIST

5: underwater communication system
21, 41, 61: PLC adapter
23: first coil coupling body
25: DC-DC converter
26: battery
27: processor
28: camera
43: second coil coupling body
45: measurement PC
63: third coil coupling body
110: first communication device
111: first communication unit
111A, 111B, 121A, 121B, 131A, 131B: resonance circuit
120: second communication device
121: second communication unit
125, 165: support member
150: water tank
160: waterproof container
170: pipe
190: desk
210: control unit
211: CPU
212: PLC_PHY block
213: PLC_MAC block
214: AFE
216: Ethernet (registered trademark) MAC block
217: Ethernet (registered trademark) PHY block
218: flash memory I/F
219: SDRAM controller
220: oscillator
221: clock IC
222: GPIO
223: UART
231: flash memory
232: SDRAM
1010: undersea communication system
1020: electric wire
1030: connecting body
1040: weight
1045: buoy
1050: marine vessel
1060: underwater vehicle 1070: submarine
1080: water bottom excavator
1090: water surface
1095: water bottom
L: inter-coil distance

The invention claimed is:

1. An underwater communication device that is adapted to communicate data in a wide band in water with another underwater communication device including another first coil and another second coil, in which a coil surface of the other first coil and a coil surface of the other second coil overlap each other, the underwater communication device comprising:
   a first coil configured to transmit data to and from the other first coil via a magnetic field;
   a second coil configured to transmit the data to and from the other second coil via a magnetic field;
   a supply unit configured to supply the data to the first coil and the second coil;
   a first capacitor connected to the first coil and forming a first resonance circuit that resonates with the first coil at a first resonance frequency; and
   a second capacitor connected to the second coil and forming a second resonance circuit that resonates with the second coil at a second resonance frequency that is different from the first resonance frequency,
   wherein a coil surface of the first coil and a coil surface of the second coil overlap each other, and a winding direction of the first coil and a winding direction of the second coil are opposite to each other.

2. The underwater communication device according to claim 1, wherein the data includes data generated in accordance with a communication method of power line communication.

3. The underwater communication device according to claim 1, wherein the data includes image data.

4. The underwater communication device according to claim 1, wherein the first coil and the second coil transmit the data in a direction substantially orthogonal to a water surface.

5. An underwater communication system that is adapted to communicate data in a wide band between a first underwater communication device and a second underwater communication device,
   wherein the first underwater communication device includes:
      a first coil;
      a second coil;
      a supply unit configured to supply data to the first coil and the second coil;
      a first capacitor connected to the first coil and forming a first resonance circuit with the first coil; and
      a second capacitor connected to the second coil and forming a second resonance circuit with the second coil,
   wherein a coil surface of the first coil and a coil surface of the second coil overlap each other,
   wherein the second underwater communication device includes:
      a third coil configured to transmit data to and from the second coil via a magnetic field;
      a fourth coil configured to transmit the data to and from the first coil via a magnetic field;
      a third capacitor connected to the third coil and forming a third resonance circuit with the third coil; and
      a fourth capacitor connected to the fourth coil and forming a fourth resonance circuit with the fourth coil,
   wherein the first resonance circuit and the second resonance circuit have different resonance frequencies,
   wherein the third resonance circuit and the fourth resonance circuit have different resonance frequencies,
   wherein the first resonance circuit and the fourth resonance circuit have the same resonance frequency,
   wherein the second resonance circuit and the third resonance circuit have the same resonance frequency, and
   wherein a coil surface of the third coil and a coil surface of the fourth coil overlap each other, and a winding direction of the third coil and a winding direction of the fourth coil are opposite to each other.

6. The underwater communication system according to claim 5, wherein a winding direction of the first coil and a winding direction of the second coil are opposite to each other.

* * * * *